United States Patent
Moussaoui

(10) Patent No.: US 12,461,829 B2
(45) Date of Patent: Nov. 4, 2025

(54) METHOD FOR MULTIMEDIA ENCODING REDUNDANCY MANAGEMENT AND APPARATUS FOR IMPLEMENTING THE SAME

(71) Applicant: ATEME, Velizy Villacoublay (FR)

(72) Inventor: Abdelmajid Moussaoui, Villebon-sur-Yvette (FR)

(73) Assignee: ATEME, Velizy Villacoublay (FR)

( * ) Notice: Subject to any disclaimer, the term of this patent is extended or adjusted under 35 U.S.C. 154(b) by 218 days.

(21) Appl. No.: 18/140,434

(22) Filed: Apr. 27, 2023

(65) Prior Publication Data
US 2023/0350771 A1    Nov. 2, 2023

(30) Foreign Application Priority Data

Apr. 28, 2022 (EP) ..................................... 22305638

(51) Int. Cl.
*G06F 11/20* (2006.01)
*H04L 67/1034* (2022.01)
*H04N 21/2662* (2011.01)
*H04N 21/438* (2011.01)

(52) U.S. Cl.
CPC ...... *G06F 11/2007* (2013.01); *H04L 67/1034* (2013.01); *H04N 21/2662* (2013.01); *H04N 21/4383* (2013.01)

(58) Field of Classification Search
None
See application file for complete search history.

(56) References Cited

U.S. PATENT DOCUMENTS

| | | | |
|---|---|---|---|
| 2010/0306813 A1* | 12/2010 | Perry | A63F 13/10 725/114 |
| 2011/0296474 A1 | 12/2011 | Babic | |

(Continued)

OTHER PUBLICATIONS

Fronza et al., "Failure prediction based on log files using Random Indexing and Support Vector Machines," The Journal of Systems and Software, Elsevier, Jan. 2013, vol. 86 (1), pp. 2-11.

(Continued)

*Primary Examiner* — Clifford Hilaire

(57) ABSTRACT

A method for managing encoding of an input multimedia content stream is proposed, which comprises: obtain a primary configuration used for encoding the input multimedia content stream for generating a primary channel; determine, based on the primary configuration, a redundancy configuration for encoding the input multimedia content stream for generating a redundancy channel; and encode the input multimedia content stream according to the redundancy configuration to generate the redundancy channel, wherein the encoding of the input multimedia content stream according to the redundancy configuration uses less resources than resources used for encoding the input multimedia content stream according to the primary configuration, and wherein the redundancy configuration is determined for distributing the redundancy channel through a distribution network in place of the primary channel upon occurrence of a failure in the encoding of the input multimedia content stream for generating the primary channel.

20 Claims, 6 Drawing Sheets

(56) References Cited

U.S. PATENT DOCUMENTS

2013/0064305 A1 3/2013 Karlsson et al.
2019/0132194 A1* 5/2019 Joshi .................. H04L 41/0846

OTHER PUBLICATIONS

Shahriar, "Video Coding Performance," in "Digital video concepts, methods, and metrics: quality, compression, performance, and power trade-off analysis," Apress Media, LLC, New York, Oct. 27, 2014, retrieved from:https://link.springer.com/content/pdf/10.1007/978-1-4302-6713-3.pdf on Apr. 20, 2023, pp. 1-359.
Turnbull et al., "Failure Prediction in Hardware Systems," Technical Report, University of California, San Diego, 2003, retrieved from: https://cseweb.ucsd.edu//~dturnbul/Papers/ServerPrediction.pdf on Apr. 20, 2023, 6 pages.
Search Report and Opinion issued in related application EP 22305638.3, Oct. 24, 2022, 15 pages.

* cited by examiner

METHOD FOR MULTIMEDIA ENCODING REDUNDANCY MANAGEMENT AND APPARATUS FOR IMPLEMENTING THE SAME

CROSS-REFERENCE TO RELATED APPLICATIONS

This application claims priority benefit under 35 U.S.C. § 119(d) from European Patent Application No. 22 305 638.3, filed Apr. 28, 2022, the disclosure of which is incorporated by reference herein in its entirety.

FIELD

The present disclosure relates to the field of redundancy management for the encoding and distribution of multimedia content, in particular for the management of resources of a video encoder for encoding multimedia content.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

Broadcast television has significantly transformed over the recent years. New audiovisual services, sometimes referred to as "non-linear services", such as Video On Demand (VOD), Catch-Up TV or Replay, have emerged, on top of traditional dynamic mode broadcasting of so-called "linear" or "live" TV services (Asymmetric Digital Subscriber Line (ADSL), Satellite, Cable, IPTV, Fiber, DVB), via operators such as cable operator or Internet triple-play providers.

Redundancy schemes, according to which multiple service instances are used in order to anticipate a failure in the delivery of a service is generally used for protecting multimedia distribution services, such as live TV broadcasting services, in a case for example where a failure occurs at a network node of the multimedia distribution network.

It would be advantageous to improve the management of redundancy in the context of encoding and distribution of multimedia content channels over multimedia distribution networks with respect to resource consumption, in particular for encoding and distribution of live multimedia content channels through a multimedia distribution network infrastructure.

There is therefore a need for providing an improved multimedia content channel encoding scheme, apparatus and software implementing the same that address at least some of the above-described drawbacks and shortcomings of the conventional technology in the art.

SUMMARY

The present subject disclosure provides examples of improved multimedia content channel encoding schemes and apparatuses implementing the same.

The present subject disclosure also provides examples of improved live multimedia content channel encoding schemes and apparatuses implementing the same.

In accordance with the present subject disclosure, as embodied and broadly described herein, in one aspect of the present subject disclosure, a computer-implemented method for managing encoding of an input multimedia content stream is proposed, which comprises: obtain a primary configuration used for encoding the input multimedia content stream for generating a primary channel; determine, based on the primary configuration, a redundancy configuration for encoding the input multimedia content stream for generating a redundancy channel; and encode the input multimedia content stream according to the redundancy configuration to generate the redundancy channel, wherein the encoding of the input multimedia content stream according to the redundancy configuration uses less resources than resources used for encoding the input multimedia content stream according to the primary configuration, and wherein the redundancy configuration is determined for distributing the redundancy channel through a distribution network in place of the primary channel upon occurrence of a failure in the encoding of the input multimedia content stream for generating the primary channel.

Thanks to the determination, based on the primary configuration, of a redundancy configuration which is less resource-consuming for the encoding of a content than the encoding of such content according to the primary configuration, the proposed scheme advantageously allows reducing the resources (type of resources and/or amount of resources) used for redundancy while still keeping a redundancy channel always ready to take over and replace the primary channel in case of a failure thereof.

In one or more embodiments, the redundancy configuration may be determined for encoding of the input multimedia content stream according to the redundancy configuration with an encoding performance which is lower than an encoding performance of the encoding of the input multimedia content stream according to the primary configuration.

In one or more embodiments, determining the redundancy configuration based on the primary configuration may comprise deactivating in the redundancy configuration one or more encoding optimization features indicated in the primary configuration as used for encoding the input multimedia content stream according to the primary configuration, and the one or more deactivated encoding optimization features may not be used for generating the redundancy channel.

In one or more embodiments, determining the redundancy configuration based on the primary configuration may comprise deactivating in the redundancy configuration one or more pre-processing features indicated in the primary configuration as used for pre-processing prior to encoding the input multimedia content stream according to the primary configuration, and the pre-processing operations corresponding to the one or more deactivated pre-processing features may not be used for generating the redundancy channel.

In one or more embodiments, the one or more pre-processing features may correspond to operations among one or more of the following operations: denoising, filtering, and sharpening.

In one or more embodiments, the primary configuration may comprise a first flag for a respective feature indicating whether a gain is expected by deactivating the respective feature in the redundancy configuration, and/or a second flag indicating whether or not the respective feature may be deactivated in the redundancy configuration.

In one or more embodiments, determining the redundancy configuration based on the primary configuration may comprise: deactivating in the redundancy configuration the feature based on the first flag and/or the second flag, and the feature may not be used for generating the redundancy channel.

In one or more embodiments, determining the redundancy configuration based on the primary configuration may comprise: in the redundancy configuration, determining a resolution of images of the input multimedia content stream which is smaller than a resolution of images of the input multimedia content stream used for encoding the input multimedia content stream according to the primary configuration, and the redundancy channel may be generated by encoding a stream in a lower resolution as compared to the resolution of the stream encoded for generating the primary channel.

In one or more embodiments wherein the distribution network includes an Over-The-Top, OTT, adaptive streaming distribution network, determining the redundancy configuration based on the primary configuration may comprise: in the redundancy configuration, determining a number of multiple video resolutions generated by encoding the input multimedia content stream according to the redundancy configuration which is smaller than a number of multiple video resolutions generated by encoding the input multimedia content stream according to the primary configuration, and the redundancy channel may be generated by encoding a stream with a lower number of multiple video resolutions as compared to the number of multiple video resolutions used for generating the primary channel.

In one or more embodiments, determining the redundancy configuration based on the primary configuration may comprise: in the redundancy configuration, determining a number of audio representations for the audio encoding of the input multimedia content stream according to the redundancy configuration which is smaller than a number of audio representations for the audio encoding of the input multimedia content stream according to the primary configuration, and the redundancy channel may be generated by audio encoding a stream with a lower number of audio representations as compared to the number of audio representations used for generating the primary channel.

In one or more embodiments, the audio representations with which the input multimedia content stream is encoded according to the primary configuration may comprise a 5:1 audio representation, and the audio representations with which the input multimedia content stream is encoded according to the redundancy configuration may not comprise the 5:1 audio representation.

In one or more embodiments, the primary channel and the redundancy channel may be generated using resources of a shared server, and the method may further comprise: updating the primary configuration to an updated primary configuration, wherein resources of the shared server that would be used if the redundancy channel was generated according to the primary configuration, and that are not used for generating the redundancy channel according to the redundancy configuration, may be allocated for the generating of the primary channel according to the updated primary configuration.

In one or more embodiments, the method may further comprise: upon failure of the generating of the primary channel, updating, based on the primary configuration, the redundancy configuration to an updated redundancy configuration that corresponds to the primary configuration; generating the redundancy channel according to the updated redundancy configuration; and distribute the redundancy channel through the distribution network.

In one or more embodiments, the updated redundancy configuration is determined by: activating one or more video encoding optimization features activated in the primary configuration, activating one or more video pre-processing operations activated in the primary configuration, updating a video resolution to a resolution configured in the primary configuration, updating a number of multiple video resolutions and corresponding resolutions to the number of multiple video resolutions and corresponding resolutions configured in the primary configuration, and/or updating a number of audio representations and corresponding representations to the number of multiple audio representations and corresponding representations configured in the primary configuration.

In another aspect of the present subject disclosure, an apparatus is proposed, which comprises a processor, and a memory operatively coupled to the processor, wherein the apparatus is configured to perform a method according to one or more embodiments proposed in the present subject disclosure.

In yet another aspect of the present subject disclosure, a non-transitory computer-readable medium encoded with executable instructions which, when executed, causes an apparatus comprising a processor operatively coupled with a memory, to perform a method according to one or more embodiments proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to perform a method for managing encoding of an input multimedia content stream, which comprises: obtain, by the processor, a primary configuration used for encoding the input multimedia content stream for generating a primary channel; determine, by the processor, based on the primary configuration, a redundancy configuration for encoding the input multimedia content stream for generating a redundancy channel; and encode by the processor, the input multimedia content stream according to the redundancy configuration to generate the redundancy channel, wherein the encoding of the input multimedia content stream according to the redundancy configuration uses less resources than resources used for encoding the input multimedia content stream according to the primary configuration, and wherein the redundancy configuration is determined for distributing the redundancy channel through a distribution network in place of the primary channel upon occurrence of a failure in the encoding of the input multimedia content stream for generating the primary channel.

In yet another aspect of the present subject disclosure, a computer program product comprising computer program code tangibly embodied in a computer readable medium, said computer program code comprising instructions to, when provided to a computer system and executed, cause said computer to perform a method according to an embodiment proposed in the present subject disclosure, is proposed.

In another aspect of the present subject disclosure, a data set representing, for example through compression or encoding, a computer program as proposed in the present subject disclosure, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous examples and advantages will become more apparent to those skilled in the art by reference to the following drawings, in conjunction with the accompanying specification, in which.

DETAILED DESCRIPTION

Figure 1A:
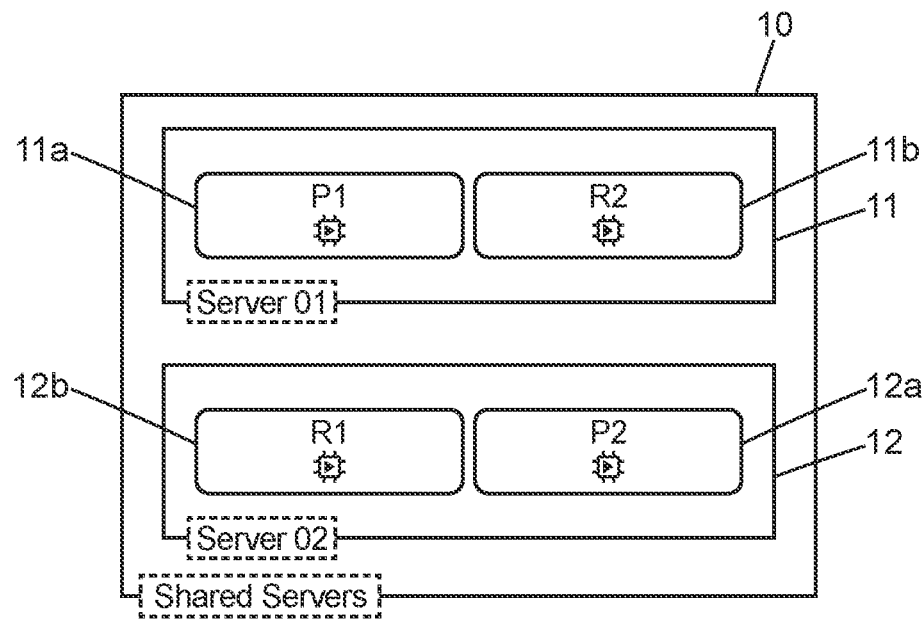
FIGS. 1a and 1b illustrate two exemplary types of redundancy architecture that may be used to implement redundancy according to one or more embodiments of the present subject disclosure.

For simplicity and clarity of illustration, the drawing figures illustrate the general manner of construction, and descriptions and details of well-known features and techniques may be omitted to avoid unnecessarily obscuring the discussion of the described embodiments of the present subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fiber, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application," "program," or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The terms "multimedia content" as used in the present description correspond to any audio and/or video or audio-visual content, with or without closed captions, open captions, subtitles, timed text or visual descriptors.

The terms "computational resources" or "CPU resources" are used interchangeably in the present description to denote any computing or Central Processing Unit (CPU) resource usable on a computing platform for processing (e.g. encoding or transcoding) multimedia content, including without limitation one or more resources corresponding to one or more of the following types of processing resources and processing resource parameters: number of CPU cores, number of GPU cores, type of CPU architecture (e.g. RISC vs. CISC), type of processing unit (CPU, GPU, FPGA), CPU core speed, RAM resources (including one or more of the following: RAM size, RAM speed, etc.) associated with computational resources, storage type resources (hot vs. cold, etc.). In one or more embodiments, the computational resources may be allocated in CPU core units, so that the proposed scheme may comprise, depending on the embodiment, the determination of a number of CPU cores to be allocated to a channel corresponding to a multimedia content stream to be encoded, or the determination of respective numbers of CPU cores to be respectively allocated to channels corresponding to multimedia content streams.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service. Likewise, the terms "live encoding" or "live transcoding" are used interchangeably to denote the encoding (respectively the transcoding) of multimedia content distributed in live mode or in dynamic mode.

In the present description, the term "real-time" as used herein in the context of video distribution, video encoding or compressing video content, refers to the encoding or compression of video content at least at the same speed, for example expressed in frames per second, as it is generated by one or more video content sources. For instance, if content is generated at 50 frames per second (fps) it is deemed encoded in real-time as long as it is also encoded at at least 50 fps.

In the present description, the terms "live content" or "live channel" are used interchangeably to denote or refer to corresponding content, for example multimedia content, of a multimedia content stream, that is distributed, for example using an Over-The-Top (OTT) distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "client" and "client unit" are used interchangeably to denote any type of device, implemented by one or more items of software, one or more items of hardware, or a combination or one or more items of software and one or more items of hardware, configured to present requests, such as resource allocation requests, to a resource management unit according to embodiments of the present subject disclosure, and to receive responses to such requests.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols and interoperate with larger networks. Various types of equipment may be used to make various architectures or various protocols interoperable. For example, a router may be used to provide a communication link or a data link between two LANs that would otherwise be separate and independent.

The proposed methods may be implemented by any video encoder or video codec configured for encoding or encoding and decoding images (or frames) of input video data, in particular configured for encoding and/or decoding live video content in real-time or near real-time, such as, for example, a video encoder and/or decoder compliant with the any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

Redundancy schemes that are typically used in multimedia distribution networks include the so-called "premium redundancy", or "1+1 redundancy" scheme. When applied in the context of encoding and distribution of live multimedia channels in a multimedia distribution system comprising an encoding subsystem and a distribution network, the premium redundancy scheme provides at least two encoding instances for every live channel which is distributed through the distribution network. In the case of two instances, one instance may be referred to as the "primary instance", and the other instance as the "redundancy instance". The primary instance is typically the instance used to actually deliver channel content to viewers, while the redundancy instance is kept in a running state, ready to take over should the primary instance fail, regardless of the reason for such failure. As is typical for redundancy schemes, the premium redundancy is configured to ensure for viewers a seamless transition between the primary instance and the redundancy instance upon failure of the primary instance.

A significant drawback of using premium redundancy for some or all of live multimedia channels (e.g. live video channels) generated and distributed over a distribution network is related to the amount of resources in the network that are preempted by the redundancy instances: the amount of such resources, in particular computing resources, consumed for the redundancy instances is quite significant, notably when considering that such resources are wasted as long as the corresponding redundancy instances are not used.

As long as a primary channel (corresponding to a primary instance) is reliable, the corresponding redundancy channel (corresponding to the corresponding redundancy instance) is not used, so that valuable resources, including computing resources, are wasted on the redundant channel. This loss of resources may have a considerable detrimental impact on the environment, which is reflected in part by the energy consumed for each of the redundant channel used by the channel distribution system, and also by the dimensioning of the encoding sub-system with respect to redundant instances, in particular the sizes or number of servers required for the generation and processing of such redundant instances. Further, the use of premium redundancy, in particular in the context of generation and distribution of live channels, inherently results in an increase of capital expenditure (capex), as the case may be, as well as operational expenditure (opex).

FIG. 1 illustrates two exemplary types of architecture that may be used to implement redundancy according to one or more embodiments of the present subject disclosure.

Shown in FIG. 1(a) is an exemplary architecture (10) which may be referred to as "shared servers", in which two servers (11, 12) are used for running two pairs of instances, each comprising a primary instance (11a, 12a) and a redundancy instance (11b, 12b) for a first channel and a second channel. The primary instance for the first channel (11a) and the redundancy instance for the second channel (11b) are run on a first server (11), while the primary instance for the second channel (12a) and the redundancy instance for the second channel (12b) are run on a second server (12), so that the two servers (11, 12) are shared in that they each are used to run a primary instance of one of the channel and a redundancy instance of the other channel.

Figure 1B:
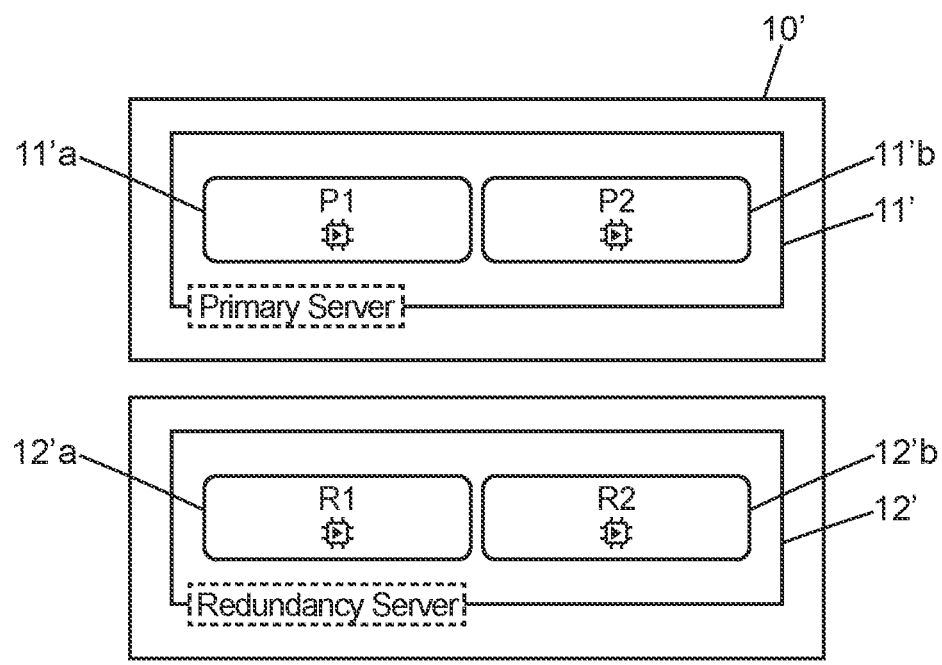

Shown in FIG. 1(b) is another exemplary architecture (10') which may be referred to as dedicated servers architecture, in which two servers (11', 12') are also used for running two pairs of primary instance (11a', 11b') and redundancy instance (12a', 12b') for a first channel and a second channel. In contrast with the shared servers approach, the primary instances for the first channel (11a') and the second channel (11b') are run on a first server (11'), which may be for this reason referred to as a "primary server", while the redundancy instances for the first channel (12a') and the second channel (12b') are run on a second server (12'), which may be for this reason referred to as a "redundancy server". The first server being dedicated to primary instances, and the redundancy server being dedicated to redundancy instances, the two servers (11', 12') are dedicated servers, instead of being shared between primary and redundancy instances. An advantage of the dedicated servers architecture is that it provides more flexibility for servers location, as the primary server and the redundancy server may be co-located or may be distant.

Figure 2:
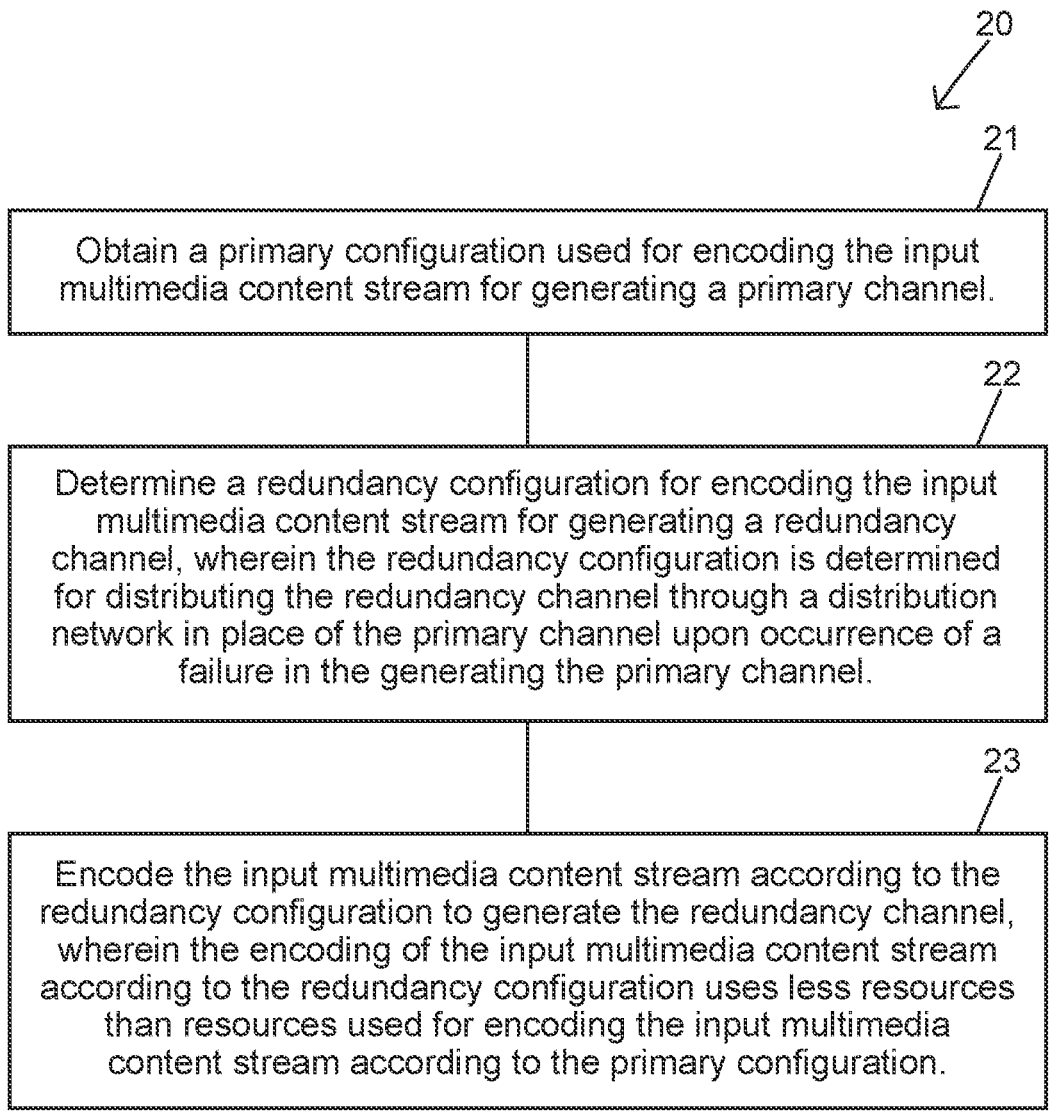
FIG. 2 is a block diagram illustrating an exemplary encoding management method in accordance with one or more embodiments.

FIG. 2 is a block diagram illustrating an exemplary multimedia content channel encoding management method 20 in accordance with one or more embodiments.

In one or more embodiments, a multimedia content channel may be encoded and distributed through a multimedia content system comprising an encoding subsystem and a distribution network. Data of an input multimedia content stream corresponding to the channel may be processed, through a so-called primary processing instance running in a processing node comprising one or more processors, such as a server, to generate a primary encoded multimedia content stream corresponding to the channel, which may then be distributed through the distribution network. Channel data processed through and generated by the primary processing instance may collectively be referred to as the primary channel.

In one or more embodiments, a configuration—referred to as the primary configuration—, including resource configuration, used by the primary processing instance, that is, for processing (e.g. encoding) the input multimedia content stream for generating the primary channel, may be obtained (21), in order to obtain a set of configuration parameters used for generating the primary channel.

Depending on the embodiment, the primary channel may be intended to be distributed to viewers through the distribution network, or may currently be distributed to viewers through the distribution network, according to a distribution mode using a suitable distribution infrastructure, such as, for example a live channel distribution on an OTT infrastructure.

In order to protect against occurrence of a failure of the primary channel, for example in the primary processing instance, redundancy may be configured through a redundancy processing instance running in the same or in a different processing node comprising one or more processors, such as a server.

In one or more embodiments, data of the input multimedia content stream corresponding to the channel may also be processed, through a so-called redundancy processing instance, to generate a redundancy encoded multimedia content stream corresponding to the channel, which may-in contrast to the primary encoded multimedia content stream-not be distributed through the distribution network. Channel data processed through and generated by the redundancy processing instance may collectively be referred to as the redundancy channel.

In order for the redundancy channel to be ready to take over in case of a failure of the primary channel, the redundancy processing instance may be configured to encode the data of the input multimedia content stream used as input data by the primary redundancy instance. However, in contrast to conventional redundancy schemes which may be configured to encode the same content with the same configuration (including processing configuration) as for the primary channel, hence which may require the same amount of resources (e.g. computing resources) as that used by the primary processing instance for generating the primary channel, the processing (e.g. encoding) of the redundancy channel may advantageously be configured, based on the primary configuration, according to a redundancy configuration which is defined so that encoding the input multimedia content stream according to the redundancy configuration uses less resources than that used for encoding the input multimedia content stream according to the primary configuration.

Therefore, in one or more embodiments, a redundancy configuration for encoding the input multimedia content stream may be determined, based on the primary configuration, for generating the redundancy channel. In some embodiments, the redundancy configuration may be defined by reducing resources (e.g. computing resources) to be used for encoding the input multimedia content stream according to the redundancy configuration as compared to the resources (e.g. computing resources) used for encoding the input multimedia content stream according to the primary configuration.

The redundancy channel may be generated by encoding the input multimedia content stream according to the redundancy configuration.

Thanks to the definition of the redundancy configuration, the encoding of the input multimedia content stream according to the redundancy configuration may use less resources (including computational resources) than resources (including respective computational resources) used for encoding the input multimedia content stream according to the primary configuration. Further, the redundancy configuration may be determined for distributing the redundancy channel through a distribution network in place of the primary channel upon occurrence of a failure in the encoding of the input multimedia content stream for generating the primary channel.

Therefore, the proposed scheme advantageously allows reducing the resources (type of resources and/or amount of resources) used for redundancy while still keeping a redundancy channel always ready to take over and replace the primary channel in case of a failure thereof.

Codec elasticity is a feature that designates the ability for a codec (e.g. a video codec) to modify its configuration (including dynamically), whether automatically or further to a configuration change command (e.g. received through a user interface), in order to achieve one or more predetermined performance quality vs. computational complexity compromises.

For example, a video encoder may be configurable according to different tradeoffs between performance quality and use of computational resources. The relationship between performance versus computational resources is positive, as the more computational resources are allocated to the video encoder, the better the obtained performance quality.

In one or more embodiments, the redundancy configuration for encoding the input multimedia content stream may be determined to provide a lower encoding performance than for encoding the input multimedia content stream according to the primary configuration. The redundancy channel may then be generated by encoding the input multimedia content stream with lower encoding performance than the encoding performance obtained when encoding the input multimedia content stream according to the primary configuration. Encoding the input multimedia content stream according to the redundancy configuration with a lower encoding performance may advantageously save resource while not impacting the user experience as the redundancy channel is not distributed to viewers.

In one or more embodiments, the redundancy configuration may be determined by disabling one or more optimization features for the redundancy channel. Depending on the embodiment, determining the redundancy configuration may include determining that one or more encoding optimization features used for encoding the input multimedia content stream according to the primary configuration are not used for encoding the input multimedia content stream according to the redundancy configuration.

Depending on the embodiment, other optimization features that may be used for encoding the input multimedia content stream may be disabled for the redundancy channel in the definition of the redundancy configuration, such as, for example, using a simplified partitioning (testing only a subset of possible partitioning), or introducing less B-frames (bi-directional frames) in the encoded stream in order to reduce the number of temporal predictions.

For example, in some embodiments, all or some of the optimization features that may be used for encoding the input multimedia content stream may be disabled for the redundancy channel in the definition of the redundancy configuration, and the video encoder may run on a fast-encoding mode for encoding the input multimedia content stream according to the redundancy configuration where for example the encoder is configured not to perform a wide search for the optimal encoding point. As a consequence, fewer computational resources may be needed for encoding the input multimedia content stream according to the redundancy configuration.

In one or more embodiments, the multimedia content encoder (e.g. video encoder) may be configured to perform one or more pre-processing operations on the input multimedia content stream prior to encoding the input multimedia content stream. Alternatively, a pre-processing unit may be used to perform one or more pre-processing operations on the input multimedia content stream prior to providing the pre-processed input multimedia content stream to the multimedia content encoder (e.g. video encoder) for encoding.

In one or more embodiments, pre-processing operations that may be performed on the input multimedia content stream may be of the different following types:

So called "mandatory" pre-processing operations include operations that are considered required in order to obtain desired video characteristics for the encoding of the input multimedia content stream.

In one or more embodiments, mandatory pre-processing operations may include one or more operations without which the encoding may not be technically performed, and/or one or more operations without which the output configuration is different from what is expected, and/or one or more operations that are required (e.g. by contract and/or according to a user subscription).

For example, in one or more embodiments, mandatory pre-processing operations may include one or more of the following operations: de-interlacing, resizing, upscaling, bit-depth change, chroma sub-sampling (yuv420, yuv444, etc.) and frame rate conversion.

In contrast to mandatory pre-processing operations, so-called "optional" pre-processing operations include operations that are used to improve the encoding performance, and without which the encoding may still be technically performed, without which the output (encoded) multimedia content stream may still be watchable by a viewer (for example, the video quality may be acceptable, and/or visual artefacts may not be present or may be limited in the output multimedia content stream), and/or without which the encoding may still be compliant with a required encoding configuration.

For example, in one or more embodiments, optional pre-processing operations may include one or more of the following operations: denoising, filtering, and sharpening.

As discussed above, in one or more embodiments, the primary configuration used for encoding the input multimedia content stream for generating the primary channel may be obtained. In some embodiments, the primary configuration may include one or more optimization features that are used for generating the primary channel by encoding the input multimedia content stream, and/or one or more pre-processing features that are used for generating the primary channel by pre-processing the input multimedia content stream prior to encoding the pre-processed input multimedia content stream.

In one or more embodiments, the primary configuration may include one or more first flags indicating for one or more corresponding features (whether optimization or pre-processing features) whether or not a gain (e.g. through less computational resource usage) may be expected by deactivating the corresponding feature.

In one or more embodiments, the primary configuration may include one or more second flags indicating for one or more corresponding features (whether optimization or pre-processing features) whether or not the corresponding feature may be deactivated. For example, the second flag for a mandatory pre-processing feature may indicate that the corresponding preprocessing operation may not be bypassed prior to encoding the input multimedia content stream for generating the redundancy channel, while the second flag for an optional pre-processing feature may indicate that the corresponding preprocessing operation may be bypassed prior to encoding the input multimedia content stream for generating the redundancy channel.

In one or more embodiments, the redundancy configuration may be determined based on the first and/or second flags included in the obtained primary configuration.

For example, in some embodiments, a feature for which the first flag indicates that a gain can be expected when the feature is deactivated, and for which the second flag indicates that the feature can be deactivated, may be deactivated as part of determining the redundancy configuration based on the primary configuration.

In other embodiments, the redundancy configuration may be determined with respect to a feature based on the second flag provided for the feature in the primary configuration, irrespective of the first flag that may be provided for the feature.

Resolution switching, which is a feature of the VVC codec for performing reference picture resampling, is another example of an optimization feature specific to the VVC codec that may be used for encoding the input multimedia content stream with a VVC encoder independently of other features such as the ones discussed above.

According to this feature, the encoding of the input multimedia content stream according to the primary configuration may use a different image resolution from that used for encoding of the input multimedia content stream according to the redundant configuration.

In one or more embodiments, the input multimedia content stream may be processed prior to being encoded according to the redundancy configuration so that it includes images of a resolution which is lower than the resolution of images of the input multimedia content stream encoded according to the primary configuration. As a result, the redundancy channel may be generated by encoding a stream in a lower resolution as compared to the resolution of the stream encoded for generating the primary channel. This difference in resolutions between the stream encoded for the primary channel and the stream encoded for the redundancy channel advantageously allows a reduction (which is potentially considerable) in the resources (e.g. computational resources) needed for generating the redundancy channel as compared to resources needed for generating the primary channel.

In one or more embodiments, the resolution switching feature may also advantageously be used for switching the resolution used for generating the redundancy channel back to that used for generating the primary channel upon failure of the primary channel. In case of a failure of the primary channel, the redundancy channel may take over with its lower resolution, and switch (as promptly as possible) to the full resolution that was used for generating the primary channel.

In one or more embodiments, the distribution network includes an Over-The-Top, OTT, adaptive streaming distribution network. In such a network, multiple resolutions (which may also be referred to as representations) may be streamed at the same time to viewers, so that the video player may select automatically the appropriate representation based on one or more network and/or player parameters (such as, for example, screen size, network health, battery level, etc.), so that the player may continuously run smoothly without rebuffering and with the optimum representation.

In one or more embodiments, determining the redundancy configuration based on the primary configuration may comprise: in the redundancy configuration, lowering a number of multiple video resolutions generated by encoding the input multimedia content stream according to the redundancy configuration as compared to a number of multiple video resolutions generated by encoding the input multimedia content stream according to the primary configuration.

As a result, in some embodiments, the redundancy channel may comprise a number of representations (or a number of multiple video resolutions) generated by encoding the input multimedia content stream according to the redundancy configuration which is lower than the number of representations (respectively number of multiple video resolutions) generated by encoding the input multimedia content stream according to the primary configuration that are comprised in the primary channel.

Advantageously, the redundancy channel will provide a smaller number of representations than that provided in the primary channel, and therefore require less resources for its generation than that required by the primary channel for its generation. For example, in some embodiments, if one or more resolutions are required by contract or by subscriptions, the redundancy configuration may be determined to keep these required resolutions, and discard one or more of the other resolutions that are not required.

In one or more embodiments, in case of a failure of the primary channel, the redundancy channel may take over with its lower number of representations, and switch (as promptly as possible) to encoding and streaming all of the required representations, and service will advantageously promptly return to its level before failure of the primary channel. Advantageously, in case of a failure of the primary channel, the players which used the primary channel will have for a limited time a smaller number of representations than under normal operating conditions (prior to the failure), but the service will return to normal very promptly, as the generating the redundancy channel may promptly switch from generating a smaller number of representations to generating the number of representations required by the viewers, which may correspond to the number of representations comprised in the primary channel.

In one or more embodiments, the resource usage optimization that is provided by the present subject disclosure may use optimization of usage of audio resources for determining the redundancy configuration.

For example, in some embodiments, determining the redundancy configuration based on the primary configuration may comprise: in the redundancy configuration, determining a number of audio representations for the audio encoding of the input multimedia content stream according to the redundancy configuration which is smaller than a number of audio representations for the audio encoding of the input multimedia content stream according to the primary configuration. As a result, in some embodiments, the redundancy channel may be generated by audio encoding a stream with a lower number of audio representations as compared to the number of audio representations used for generating the primary channel.

For example, in some embodiments, a stereo profile may be delivered in the redundancy channel instead of a 5:1 audio profile or other audio representations which are delivered in the primary channel.

In one or more embodiments, one or more of the optimizations for configuring the generation of the redundancy channel provided in the present subject disclosure may lead to reducing the resource usage for generating the redundancy channel, and therefore reducing the amount of resources allocated to generating the redundancy channel as compared to the amount of resources allocated to generating the primary channel. Different types of resources, such as for example, computational resources (e.g. CPU and/or GPU resources), memory resources (e.g. RAM resources), may be saved as a result of using a proposed scheme according to one or more embodiments of the present subject disclosure.

In some embodiments, some or all of the saved resources may be used for other operations, such as for example file transcoding for VOD (Video On Demand) or batch jobs, so that a job that has a limited execution time may be evicted if needed.

In other embodiments, some or all of the saved resources may be left unused for energy saving purposes.

Failure of the generating of a primary channel may occur, for example due to a failure (e.g. hardware failure) of a server on which a computing job of generating the primary server is running, or due to an application-level failure (e.g. a software failure) of an application for generating the primary channel.

In one or more embodiments, upon failure of the generating of a primary channel, the redundancy configuration may be updated, based on the primary configuration, to an updated redundancy configuration that corresponds to the primary configuration, so that the redundancy channel may take over and replace the failing primary channel. The redundancy channel may therefore be generated according to the updated redundancy configuration, and be distributed through the distribution network.

Figure 3:
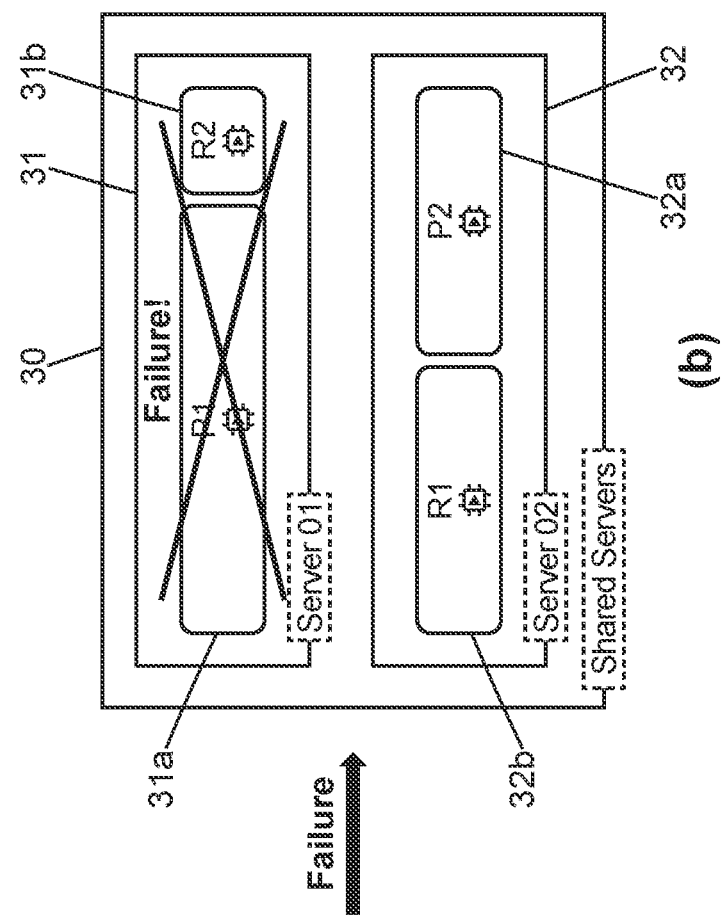
FIG. 3 illustrates an exemplary redundancy use case in accordance with one or more embodiments.
Figure 3:
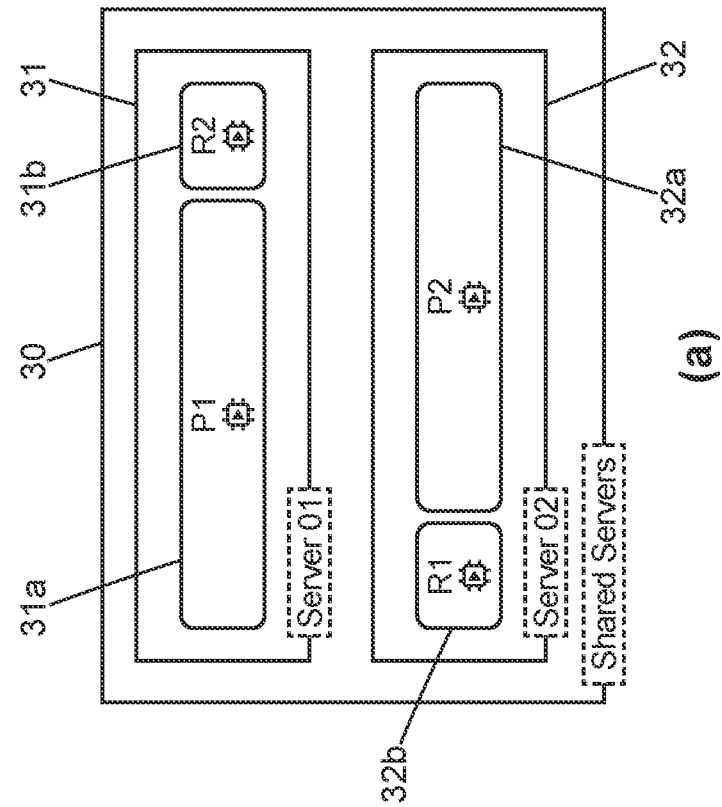

FIG. 3 illustrates an exemplary redundancy use case in accordance with one or more embodiments.

Shown on FIG. 3(a) is an exemplary shared servers architecture (30), in which two servers (31, 32) are used for running two pairs of instances, each comprising a primary instance (31a, 32a) and a redundancy instance (31b, 32b) for a first channel and a second channel. The primary instance for the first channel (31a) and the redundancy instance for the second channel (31b) are run on a first server (31), while the primary instance for the second channel (32a) and the redundancy instance for the second channel (32b) are run on a second server (32), so that the two servers (31, 32) are shared in that they each are used to run a primary instance of one of the channel and a redundancy instance of the other channel.

As illustrated by FIG. 3(a), in one or more embodiments, the primary instance (31a) for the first channel may use more resources (e.g. computational resources, memory resources, etc.) of the first server (31) than the redundancy instance for the second channel (31b). Likewise, in one or more embodiments, the primary instance (32a) for the second channel may use more resources (e.g. computational resources, memory resources, etc.) of the second server (32) than the redundancy instance for the second channel (32b). Thanks to the present subject disclosure, this contrasts with the conventional resource allocation shown on FIG. 1a, in which the primary instance for each channel uses the same amount of resources of the respective server than the redundancy instance for the other channel.

In one or more embodiments in which the primary channel and the redundancy channel are generated using resources of a shared server, the primary configuration may be updated to an updated primary configuration, wherein resources of the shared server that would be used if the redundancy channel was generated according to the primary configuration, and that are not used for generating the redundancy channel according to the redundancy configuration, are allocated for the generating of the primary channel according to the updated primary configuration.

Depending on the embodiment, the updated redundancy configuration may be determined by activating one or more video encoding optimization features activated in the primary configuration, activating one or more video pre-processing operations activated in the primary configuration, updating a video resolution to a resolution configured in the primary configuration, updating a number of multiple video resolutions and corresponding resolutions to the number of multiple video resolutions and corresponding resolutions configured in the primary configuration, and/or updating a number of audio representations and corresponding representations to the number of multiple audio representations and corresponding representations configured in the primary configuration. Advantageously, the redundancy configuration may be updated further to a failure of the corresponding primary channel by reactivating or updating features or operations that were deactivated or reduced in order to save resources for the generating of the redundancy channel.

FIG. 3(a) illustrates such embodiments in which part of all of the resources that are spared from a redundancy channel in a shared servers architecture are reallocated to a primary channel running on the same server. Advantageously, the increase in resources allocated to generation of the primary channel can lead to a better performance, hence a better quality of experience to the end user with the same cost in terms of hardware resources and energy consumption. The spared resources can also be allocated to a third-party job, or simply be freed to save energy.

In case of a failure of the first channel, for example a failure of the server on which the primary instance of the first channel is running as illustrated on FIG. 3(b), the first server (31) may be failing, so that the redundancy instance of the first channel (32b) which is running on the second server (32) may take over, and replace the primary instance of the first channel (31a) which was running on the first server (31).

In one or more embodiments, the redundancy instance of the first channel (32b) which is running on the second server (32) may transition from a redundancy configuration to a primary failure configuration according to which the generating the first channel on the second server (32) is using more resources than resources that were used by the redundancy instance of the first channel (32b) which was running on the second server (32) prior to the failure. In order to do so, in some embodiments, the primary instance of the second channel (32a) which is running on the second server (32) may transition from a primary configuration to a primary failure configuration according to which the generating the second channel on the second server (32) is using less resources than resources that were used by the primary instance of the second channel (32a) which was running on the second server (32) prior to the failure.

For example, as illustrated by FIG. 3(b), the redundancy instance of the first channel (32b) which is running on the second server (32) and the primary instance of the second channel (32a) which is also running on the second server (32) may both transition to respective resource usage configurations whereby they use a substantially similar amount of resources of the second server (32).

Therefore, in some embodiments, in cases where a server or a primary channel fails, the corresponding redundancy channel can advantageously be immediately or promptly allocated the amount of resources needed.

Figure 4:
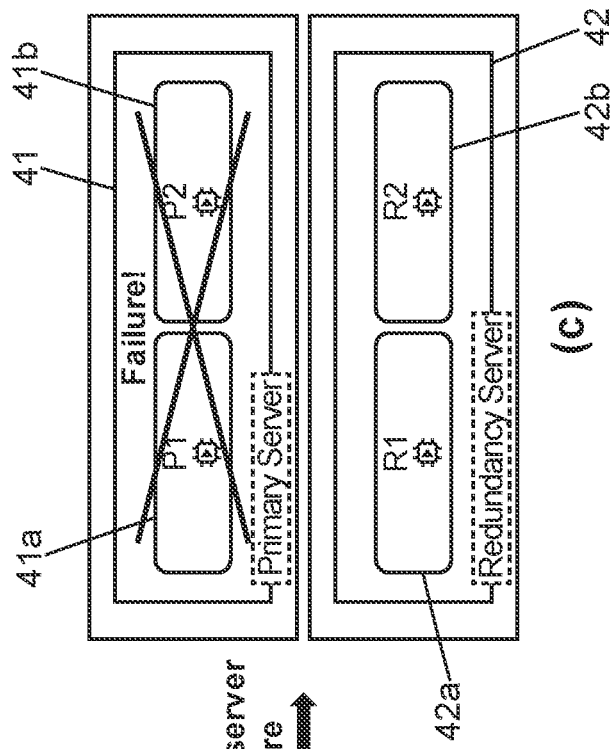
FIG. 4 illustrates an exemplary redundancy use case in accordance with one or more embodiments.
Figure 4:
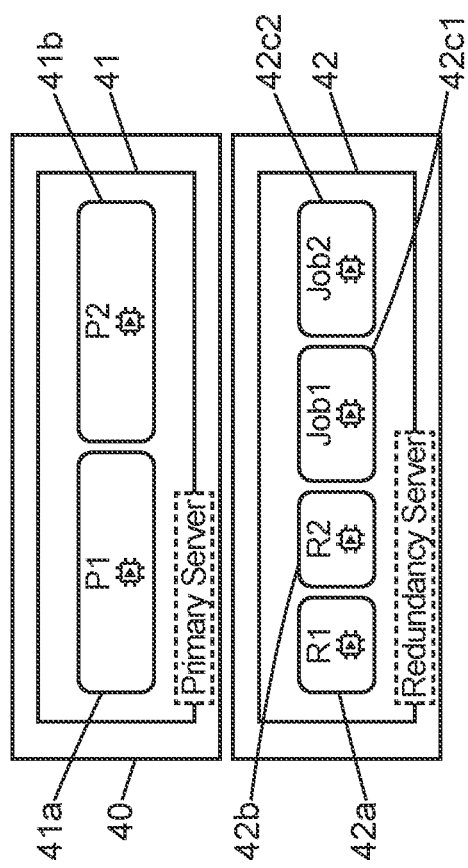
Figure 4:
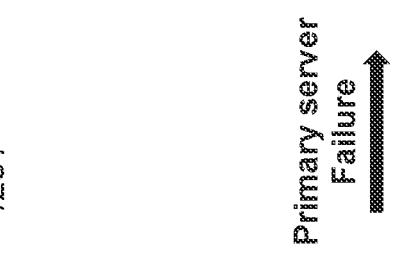
Figure 4:
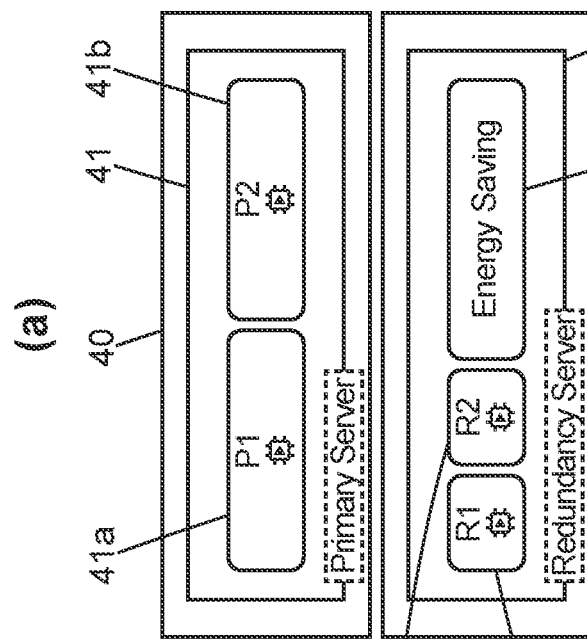

FIG. 4 illustrates another exemplary redundancy use case in accordance with one or more embodiments.

Shown on FIG. 4(a) is an exemplary dedicated servers architecture (40), in which two servers (41, 42) are used for running two pairs of primary instance (41a, 41b) and redundancy instance (42a, 42b) for a first channel and a second channel. The primary instances for the first channel (41a) and the second channel (41b) are run on the first server (41) (the "primary server"), while the redundancy instances for the first channel (42a) and the second channel (42b) are run on the second server (42) (the "redundancy server").

As illustrated by FIG. 4(a), in one or more embodiments, each of the respective primary instances (41a, 42a) for the first and second channels may use more resources (e.g. computational resources, memory resources, etc.) of the first server (41) than their respectively corresponding redundancy instances (42a, 42b) that are running on the second server (42). Thanks to the present subject disclosure, this contrasts with the conventional resource allocation shown on FIG. 1b, in which the primary instance (11a', 11b') for each channel uses on the first server (11') the same amount of resources than the redundancy instance (12a', 12b') for the channel that runs on the second server (12').

FIG. 4(a) illustrates embodiments in which resources that are spared for the redundancy channels in the second server (42) are allocated to one or more computing jobs (42c1, 42c2) that are running on the second server (42). Advantageously, the spare of resources used by the redundancy instances as compared to resources used by the primary instances on the first server allows launching one or more additional jobs on the second server that may use the spared resources.

In other embodiments, part or all of these spared resources (42d) may be left unused in order to save energy, as illustrated by FIG. 4(b).

In case of a failure of the primary server (41) as illustrated on FIG. 4(c), the primary instances of the first and second channels (41a, 41b) may fail, so that the redundancy instances of the first and second channels (42a, 42b) which are both running on the second server (42) may take over, and replace the primary instances of the first and second channels (41a, 41b) which were running on the first server (41).

In one or more embodiments, the redundancy instance of the first channel (42a) which is running on the second server (42) may transition from a redundancy configuration to a primary failure configuration according to which the generating the first channel on the second server (42) is using more resources than resources that were used by the redundancy instance of the first channel (42a) which was running on the second server (42) prior to the failure. Likewise, in some embodiments, the redundancy instance of the second channel (42a) which is running on the second server (42) may transition from a redundancy configuration to a primary failure configuration according to which the generating the second channel on the second server (42) is using more resources than resources that were used by the redundancy instance of the second channel (42b) which was running on the second server (42) prior to the failure.

For example, as illustrated by FIG. 4(c), the redundancy instances of the first and second channels (42a, 42b) which are running on the second server (42) may both transition to respective resource usage configurations whereby they use a substantially similar amount of resources of the second server (32), whereby the resources that were spared prior to the failure are preempted by the redundancy instances of the first and second channels (42a, 42b) which are running on the second server (42) according to their new primary failure configurations.

Therefore, in some embodiments, in cases where a primary server fails, all of the primary channels running on the failing server also fail, and the corresponding redundancy channels can advantageously be immediately or promptly allocated the amount of resources needed to run on the redundancy server with respective configurations that correspond to the configuration of their corresponding primary channel prior to the failure.

Figure 5:
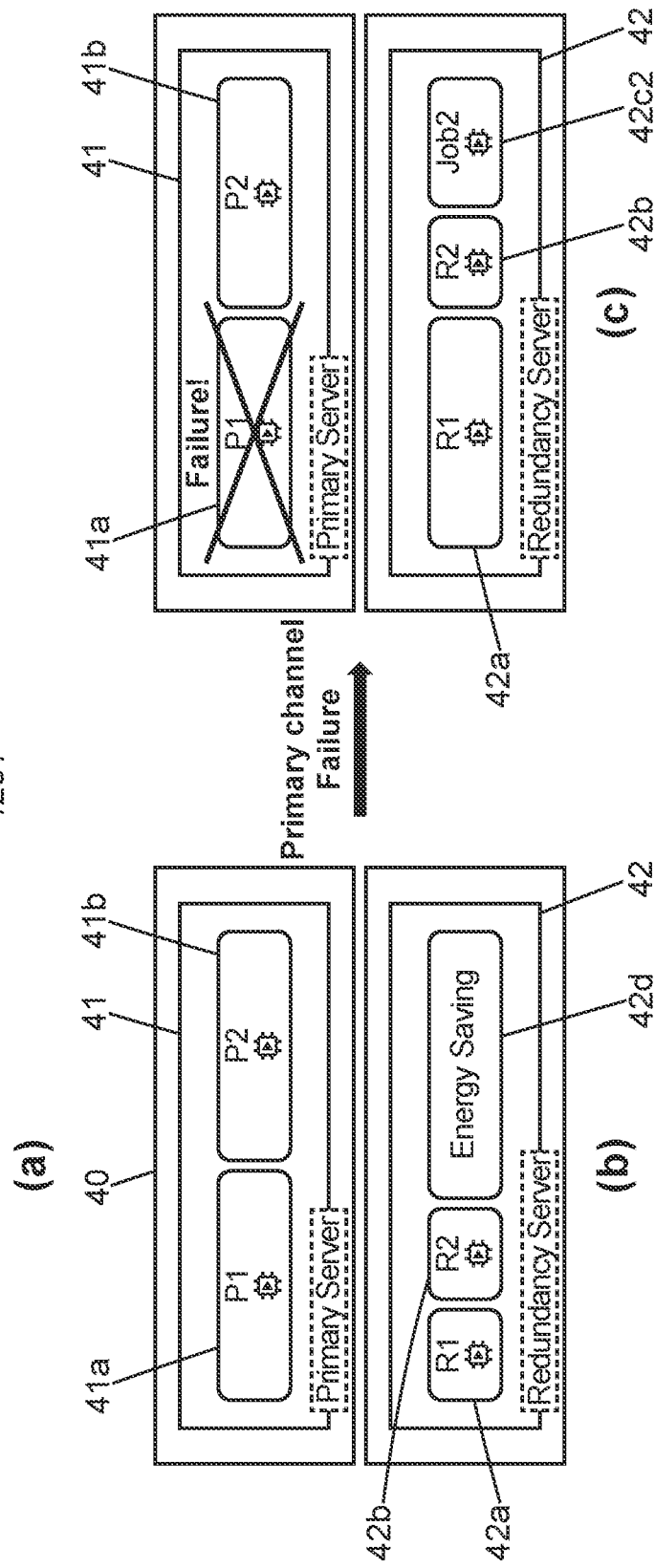
FIG. 5 illustrates an exemplary redundancy use case in accordance with one or more embodiments.

FIG. 5 illustrates use cases that are similar to that illustrated by FIG. 4, except that it illustrates a case where a failure occurs only at the application level.

The exemplary dedicated servers architectures 40 before the failure shown on FIGS. 5(a) and (b) are identical to that shown on FIGS. 4(a) and (b), respectively.

As illustrated by FIG. 5(c), in case of a failure, for example at the application level, of the primary instance (41a) of the first channel that is running on the primary server (41), the redundancy instance (42a) of the first channel which is running on the second server (42) may take over, and replace the failing primary instance (41a) of the first channel.

In one or more embodiments, the redundancy instance of the first channel (42a) which is running on the second server (42) may transition from a redundancy configuration to a primary failure configuration according to which the generating the first channel on the second server (42) is using more resources than resources that were used by the redundancy instance of the first channel (42a) which was running on the second server (42) prior to the failure. In contrast, in some embodiments, the redundancy instance of the second channel (42b) which is running on the second server (42) may not transition to any new configuration as the corresponding primary instance (41b) which is running on the first server (41) is not failing.

For example, as illustrated by FIG. 5(c), the redundancy instance of the first channel (42a) which is running on the second server (42) may transition to a new resource usage configuration whereby it uses a substantially similar amount of resources of the second server (32) to the amount of resources that was used on the first server by the corresponding primary instance prior to the failure, whereby the resources that were allocated prior to the failure to the first job 42cl are preempted by the redundancy instance of the first channel (42a) which is running on the second server (42) according to its new primary failure configuration.

Therefore, in some embodiments, in cases where a primary channel fails on a primary server, the corresponding redundancy channel can advantageously be immediately or promptly allocated the amount of resources needed to run on the redundancy server with a configuration that corresponds to the configuration of the primary channel prior to the failure.

In one or more embodiments, in cases where one or more primary channels fail, the corresponding redundancy channels may take over without any delay so that the user will advantageously experience no service interruption. When using resource usage optimization according to embodiments of the present subject disclosure, the redundancy channels can advantageously be always ready even with lower performance. Immediately or very promptly after the redundancy channel takes over, the resource allocation may scale up, and the encoder configuration may in some embodiments become identical or similar to that used for the primary channel. For example, one or more of the following configuration parameters may be updated upon primary channel failure (e.g. server failure and/or application-level failure): optimization and pre-processing features activated, resolution switched back to normal, encoding of the required number of representations, restoring the audio profile, eviction or reduction of any job that is using resources needed by the redundancy channel taking over.

Figure 6:
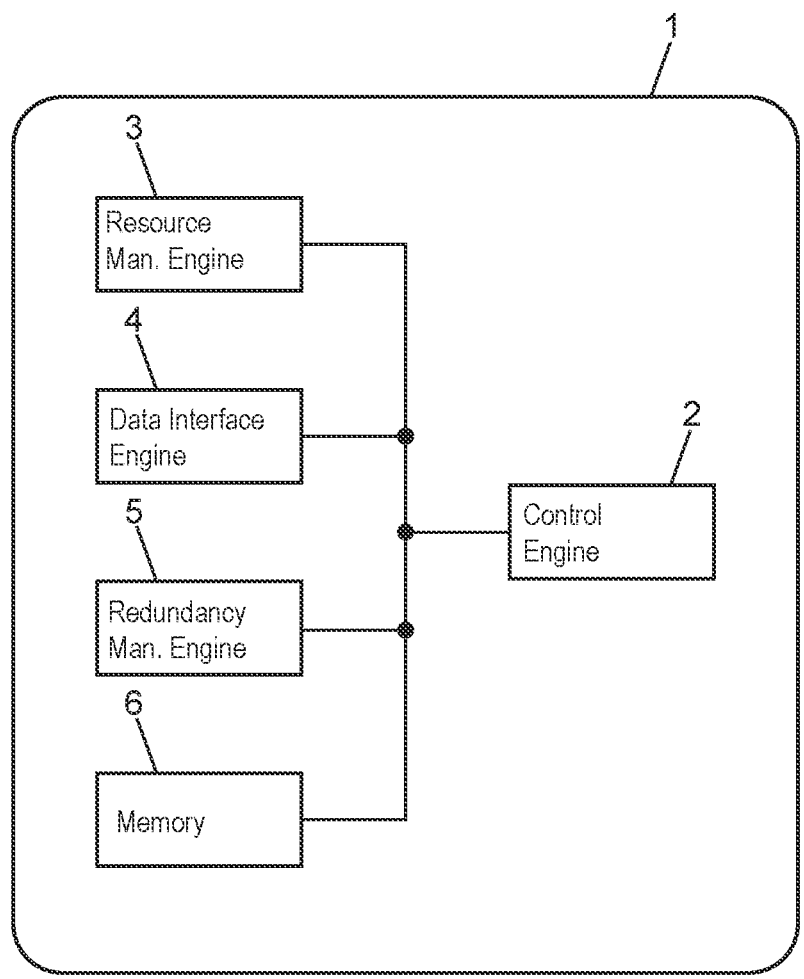
FIG. 6 illustrates an exemplary apparatus according to one or more embodiments.

FIG. 6 illustrates an exemplary apparatus 1 configured to use a multimedia content stream encoding management feature in accordance with embodiments of the present subject disclosure. The apparatus 1 may, depending on the embodiment, be comprised in a processing node of a multimedia content distribution network (CDN), in a server platform which comprises one or more servers (which may be cloud-based), in a computational resource management unit of a processing node of a multimedia content distribution network, or of a server platform, or in an operation and management unit of a multimedia content distribution network.

The apparatus 1, which may comprise one or more computers, includes a control engine 2, resource management engine 3, a data interface engine 4, redundancy management engine 5, and a memory 6.

In the architecture illustrated on FIG. 6, all of the resource management engine 3, data interface engine 4, redundancy management engine 5, and memory 6 are operatively coupled with one another through the control engine 2.

In one or more embodiments, the resource management engine 3 may be configured to perform various aspects of embodiments of one or more of the proposed methods as described herein. In some embodiments, the resource management engine 3 may be implemented in software and incorporated in a computing machine running on a server and operating with an orchestration software (e.g. Kubernetes) according to embodiments of the present subject disclosure.

In some embodiments, the redundancy management engine 5 is configured to perform various aspects of embodiments of one or more of the proposed methods as described herein.

In some embodiments, the data interface engine 4 is configured to receive as input data one or more multimedia content streams to be encoded by a computing platform configured with computation resources, for distribution (e.g. in dynamic mode) to viewing devices through a distribution network, such as for example comprising a CDN.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 6, capable of storing computer program instructions or software code that, when executed by the processor, causes the processor to perform the elements described herein. In addition, the memory 6 may be any type of data storage computer storage medium, capable of storing resource data, including resource allocation rules, resource allocation status, and resource status data (e.g. CPU status data) for use according to one or more embodiments of the present subject disclosure, coupled to the control engine 2 and operable with the data interface engine 4, redundancy management engine 5, and the resource management engine 3 to facilitate management and processing of resource data stored in association therewith.

In embodiments of the present subject disclosure, the apparatus 1 is configured for performing the computational resource allocation methods described herein.

It will be appreciated that the apparatus 1 shown and described with reference to FIG. 5 is provided by way of example only. Numerous other architectures, operating environments, and configurations are possible. Other embodiments of the node may include fewer or greater number of components, and may incorporate some or all of the functionality described with respect to the apparatus components shown in FIG. 6. Accordingly, although the control engine 2, resource management engine 3, data interface engine 4, redundancy management engine 5, and memory 6 are illustrated as part of the apparatus 1, no restrictions are placed on the location and control of components 2-6. In particular, in other embodiments, components 2-6 may be part of different entities or computing systems.

While the present subject disclosure has been described with respect to preferred embodiments, those skilled in the art will readily appreciate that various changes and/or modifications can be made to the present subject disclosure without departing from the spirit or scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method for managing encoding of an input multimedia content stream, the method comprising:
obtain a primary configuration used for encoding the input multimedia content stream for generating a primary channel;
determine, based on the primary configuration, a redundancy configuration for encoding the input multimedia content stream for generating a redundancy channel; and
encode the input multimedia content stream according to the redundancy configuration to generate the redundancy channel,
wherein the encoding of the input multimedia content stream according to the redundancy configuration uses less resources than resources used for encoding the input multimedia content stream according to the primary configuration,
wherein the redundancy configuration is determined for distributing the redundancy channel through a distribution network in place of the primary channel upon occurrence of a failure in the generating the primary channel, and
wherein one or more of one or more deactivated encoding optimization features indicated in the primary configuration as used for encoding the input multimedia content stream according to the primary configuration and one or more pre-processing features indicated in the primary configuration as used for pre-processing prior to encoding the input multimedia content stream according to the primary configuration are not used for generating the redundancy channel.

2. The method according to claim 1, wherein the redundancy configuration is determined for encoding of the input multimedia content stream according to the redundancy configuration with an encoding performance which is lower than an encoding performance of the encoding of the input multimedia content stream according to the primary configuration.

3. The method according to claim 1, wherein determining the redundancy configuration based on the primary configuration comprises deactivating in the redundancy configuration the one or more encoding optimization features.

4. The method according to claim 1, wherein determining the redundancy configuration based on the primary configuration comprises deactivating in the redundancy configuration the one or more pre-processing features.

5. The method according to claim 4, wherein the one or more pre-processing features correspond to operations among one or more of: denoising, filtering, and sharpening.

6. The method according to claim 1, wherein the primary configuration comprises a first flag for a respective feature indicating whether a gain is expected by deactivating the respective feature in the redundancy configuration, and/or a second flag indicating whether or not the respective feature may be deactivated in the redundancy configuration.

7. The method according to claim 6, wherein determining the redundancy configuration based on the primary configuration comprises: deactivating in the redundancy configuration the feature based on the first flag and/or the second flag, and wherein the feature is not used for generating the redundancy channel.

8. The method according to claim 1, wherein determining the redundancy configuration based on the primary configuration comprises: in the redundancy configuration, determining a resolution of images of the input multimedia content stream which is smaller than a resolution of images of the input multimedia content stream used for encoding the input multimedia content stream according to the primary configuration, and wherein the redundancy channel is generated by encoding a stream in a lower resolution as compared to the resolution of the stream encoded for generating the primary channel.

9. The method according to claim 1, wherein the distribution network includes an Over-The-Top, OTT, adaptive streaming distribution network, wherein determining the redundancy configuration based on the primary configuration comprises: in the redundancy configuration, determining a number of multiple video resolutions generated by encoding the input multimedia content stream according to the redundancy configuration which is smaller than a number of multiple video resolutions generated by encoding the input multimedia content stream according to the primary configuration, and wherein the redundancy channel is generated by encoding a stream with a lower number of multiple video resolutions as compared to the number of multiple video resolutions used for generating the primary channel.

10. The method according to claim 1, wherein determining the redundancy configuration based on the primary configuration comprises: in the redundancy configuration, determining a number of audio representations for the audio encoding of the input multimedia content stream according to the redundancy configuration which is smaller than a number of audio representations for the audio encoding of the input multimedia content stream according to the primary configuration, and wherein the redundancy channel is generated by audio encoding a stream with a lower number of audio representations as compared to the number of audio representations used for generating the primary channel.

11. The method according to claim 1, wherein the primary channel and the redundancy channel are generated using resources of a shared server, the method further comprising:
updating the primary configuration to an updated primary configuration, wherein resources of the shared server that would be used if the redundancy channel was generated according to the primary configuration, and that are not used for generating the redundancy channel according to the redundancy configuration, are allocated for the generating of the primary channel according to the updated primary configuration.

12. The method according to claim 1, further comprising:
upon failure of the generating of the primary channel, updating, based on the primary configuration, the redundancy configuration to an updated redundancy configuration that corresponds to the primary configuration;
generating the redundancy channel according to the updated redundancy configuration; and
distribute the redundancy channel through the distribution network.

13. The method according to claim 12, wherein the updated redundancy configuration is determined by: activating one or more video encoding optimization features activated in the primary configuration, activating one or more video pre-processing operations activated in the primary configuration, updating a video resolution to a resolution configured in the primary configuration, updating a number of multiple video resolutions and corresponding resolutions to the number of multiple video resolutions and corresponding resolutions configured in the primary configuration, and/or updating a number of audio representations and corresponding representations to the number of multiple audio representations and corresponding representations configured in the primary configuration.

14. An apparatus, the apparatus comprising a processor and a memory operatively coupled to the processor, wherein the processor is configured to perform a method for managing encoding of an input multimedia content stream, the method comprising:
obtain a primary configuration used for encoding the input multimedia content stream for generating a primary channel;
determine, based on the primary configuration, a redundancy configuration for encoding the input multimedia content stream for generating a redundancy channel; and
encode the input multimedia content stream according to the redundancy configuration to generate the redundancy channel,
wherein the encoding of the input multimedia content stream according to the redundancy configuration uses less resources than resources used for encoding the input multimedia content stream according to the primary configuration,
wherein the redundancy configuration is determined for distributing the redundancy channel through a distribution network in place of the primary channel upon occurrence of a failure in the generating the primary channel, and
wherein one or more of one or more deactivated encoding optimization features indicated in the primary configuration as used for encoding the input multimedia content stream according to the primary configuration and one or more pre-processing features indicated in the primary configuration as used for pre-processing prior to encoding the input multimedia content stream according to the primary configuration are not used for generating the redundancy channel.

15. A non-transitory computer-readable medium encoded with executable instructions which, when executed, causes an apparatus comprising a processor operatively coupled with a memory, to perform a method for managing encoding of an input multimedia content stream, the method comprising:
obtain a primary configuration used for encoding the input multimedia content stream for generating a primary channel;
determine, based on the primary configuration, a redundancy configuration for encoding the input multimedia content stream for generating a redundancy channel; and
encode the input multimedia content stream according to the redundancy configuration to generate the redundancy channel,
wherein the encoding of the input multimedia content stream according to the redundancy configuration uses less resources than resources used for encoding the input multimedia content stream according to the primary configuration,
wherein the redundancy configuration is determined for distributing the redundancy channel through a distribution network in place of the primary channel upon occurrence of a failure in the generating the primary channel, and
wherein one or more of one or more deactivated encoding optimization features indicated in the primary configuration as used for encoding the input multimedia content stream according to the primary configuration and one or more pre-processing features indicated in the primary configuration as used for pre-processing prior to encoding the input multimedia content stream according to the primary configuration are not used for generating the redundancy channel.

16. The apparatus according to claim 14, wherein the redundancy configuration is determined for encoding of the input multimedia content stream according to the redundancy configuration with an encoding performance which is lower than an encoding performance of the encoding of the input multimedia content stream according to the primary configuration.

17. The apparatus according to claim 14, wherein determining the redundancy configuration based on the primary configuration comprises deactivating in the redundancy configuration the one or more encoding optimization features.

18. The apparatus according to claim 14, wherein determining the redundancy configuration based on the primary configuration comprises deactivating in the redundancy configuration the one or more pre-processing features.

19. The non-transitory computer-readable medium according to claim 15, wherein the redundancy configuration is determined for encoding of the input multimedia content stream according to the redundancy configuration with an encoding performance which is lower than an encoding performance of the encoding of the input multimedia content stream according to the primary configuration.

20. The non-transitory computer-readable medium according to claim 15, wherein determining the redundancy configuration based on the primary configuration comprises deactivating in the redundancy configuration the one or more encoding optimization features.

\* \* \* \* \*